US005288195A

United States Patent [19]

McIntyre

[11] Patent Number: 5,288,195

[45] Date of Patent: Feb. 22, 1994

[54] INCINERATOR ASH DUMPING CONTAINER

[76] Inventor: Roger L. McIntyre, 348 Kaufman, Dubuque, Iowa 52001

[21] Appl. No.: 854,682

[22] Filed: Mar. 20, 1992

[51] Int. Cl.[5] ................................................ B65G 67/02

[52] U.S. Cl. ................................... 414/400; 414/608; 414/607; 414/422; 414/421; 414/216; 414/212; 414/424; 414/404; 110/165 R; 110/170; 110/171

[58] Field of Search ............... 414/607, 422, 419, 421, 414/424, 147, 212, 216, 400, 404; 110/147, 165 R, 167, 170, 171; 432/239, 241

[56] References Cited

U.S. PATENT DOCUMENTS

| | | | |
|---|---|---|---|
| 2,375,436 | 5/1945 | Noack | 110/165 R |
| 3,430,767 | 3/1969 | Lawalin et al. | 414/608 X |
| 3,656,643 | 4/1972 | Keneson . | |
| 4,276,121 | 6/1981 | Rogers | 414/212 X |
| 4,385,860 | 5/1983 | Corbin | 414/424 X |
| 4,405,278 | 9/1983 | Kvalheim . | |
| 4,408,946 | 10/1983 | Haven . | |
| 4,705,446 | 11/1987 | Miller . | |

FOREIGN PATENT DOCUMENTS

| | | | |
|---|---|---|---|
| 833924 | 3/1952 | Fed. Rep. of Germany | 414/424 |
| 2909532 | 9/1980 | Fed. Rep. of Germany | 414/422 |
| 41331 | 7/1930 | Netherlands | 414/216 |
| 8902409 | 3/1989 | PCT Int'l Appl. | 414/607 |
| 2231399 | 11/1990 | United Kingdom | 110/170 |

*Primary Examiner*—Frank E. Werner
*Attorney, Agent, or Firm*—Richard C. Litman

[57] ABSTRACT

A dumping container for collecting, transporting and dumping primarily ashes removed from an incinerator. A pair of pivoted fore and aft frame members, of hollow box like crossection engage the tines of a manual cable operated hoist. The cable hoist provides the mobility needed to transport the dumping container to the incinerator, elevate it to the open top receiving vessel, and provide tilting and dumping in cooperation with a pair of hooking members on the bottom of the dumping container and the pivotal action of the dumping container fore and aft frame members. An integral water spray bar, connectable to an external water supply, provides water to wet down the ashes during the removal operation.

8 Claims, 2 Drawing Sheets

INCINERATOR ASH DUMPING CONTAINER

BACKGROUND OF THE INVENTION

1. Field of the Invention

The present invention relates generally to the collection and transporting of loose material from one point to another, and more, particularly to an apparatus for collecting, transporting and dumping the ash from an incinerator clean out to a central trash. dumpster.

2. Description of Related Prior Art

Dump boxes which are utilized to collect and transport trash and other discarded materials, many of which comprise a mechanical dumping feature, and some of which are operated by forklift trucks, are well known in the prior art.

U.S. Pat. No. 4,408,946, issued Oct. 11, 1983 to James Haven discloses an automatic dumping hopper for use with a forklift. This hopper, useful as a dumping trash hopper, or for loose bulk material, has three vertical sides, and a steeply inclined front wall which facilitates prompt unloading of the contents when the hopper is tilted. This hopper is designed to be lifted, transported and dumped by the action of the forklift truck alone.

U.S. Pat. No. 3,656,643, issued Apr. 18, 1972 to George Keneson, discloses a dumping box having a bottom surface, 3 vertical sides and open at the front. The tines of a forklift enter a pair of pivoting stirrups one on each side of the box well behind the center of gravity of box and contents. There are two locations on each side of the box, whereby means to prevent rotation of the box bear upon the tines as inserted through the pivot stirrups. When the dumping box is transported to the refuse, site, it can be lowered, partially disengaged from the forklift, and the contents dumped by rotation of the dump box. This invention can only be used to discharge material on the ground or other firm surface.

U.S. Pat. No. 4,405,278, issued on Sep. 20, 1983 to A. M. Kvalheim, discloses a self emptying dump box for temporary material storage and transporting; the forklift operator can tilt the container, causing it to dump. The container comprises three vertical sides and a hinged front door member. The container body rests on a fore and aft mounted frame comprising two box-like metal channels. There is also a hinged actuating bar mounted at the bottom surface of the dump box which serves two functions: (a) unlatching the hinged discharge door; and (b) tilting the box over to dump the contents into the central receiving vessel.

U.S. Pat. No. 4,705,446, issued Nov. 10, 1987 to Richard J. Miller, discloses a hoisting and dumping container suitable for use at high rise construction sites. The container has an open top and a dumping end gate pivoted at the bottom. Box like rectangular frame members on each side of the container provide horizontal support and also a pivot structure, such that release of a connection between the box and the frame permits the box to tilt to a dumping position.

All of the above prior art inventions have general utility as receptacles for trash collection and transport, but none of the above inventions and patents, taken either singly or in combination, is seen to describe the instant invention as disclosed and claimed, which comprises special structural features well suited to the task of removing hot ashes from an incinerator.

SUMMARY OF THE INVENTION

By the present invention, an improved dumping container for the collection, cooling, local transport, and dumping of incinerator ash is disclosed. Examples of facilities that have incinerators of the size for which the instant invention is applicable include hospitals, institutional buildings and many industrial buildings.

Accordingly, it is a principal object of the present invention to provide an incinerator ash dumping container structurally proportioned to provide a satisfactory interface with the clean out door opening of an incinerator.

It is another object of the present invention to provide a dumping container with three containment sides, a partially closed top portion, and no front closure, for ready entrainment and collection of the incinerator ash by maintenance personnel.

Still another object of the present invention is to cool the hot ashes being pulled from an incinerator by means of a water spray built into the dumping container, thus minimizing the escape of dust during the collection process, and eliminating any fire hazard during the transport and dumping operation.

Another object of the invention is to provide effective fume and smoke suppression features so as to virtually eliminate the escape of fumes and smoke into the environment.

A further object of the present invention is to eliminate the need to use protective clothing, safety eye wear or respiratory protection by the person or persons assigned to clean out incinerators.

Another object of the invention is to substantially reduce the amount of time required to clean out ashes that have accumulated in an incinerator, unlike the conventional method, which is to shovel the ashes out of the incinerator and deposit the same into a trash container for transport and ultimate disposal.

Another object of the present invention is to provide a fore and aft mounting frame for the dumping container comprising two box like channels which are proportioned to be engaged by the lifting tines of a portable manual hoist.

Still a further object of the present invention is to provide a dumping feature whereby the dumping container, having been wheeled on a hoist to the side of the central deposit vessel, may be readily tilted and the contents released by utilizing the hoist only.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

DETAILED DESCRIPTION OF THE PREFERRED EMBODIMENTS

Figure 1:
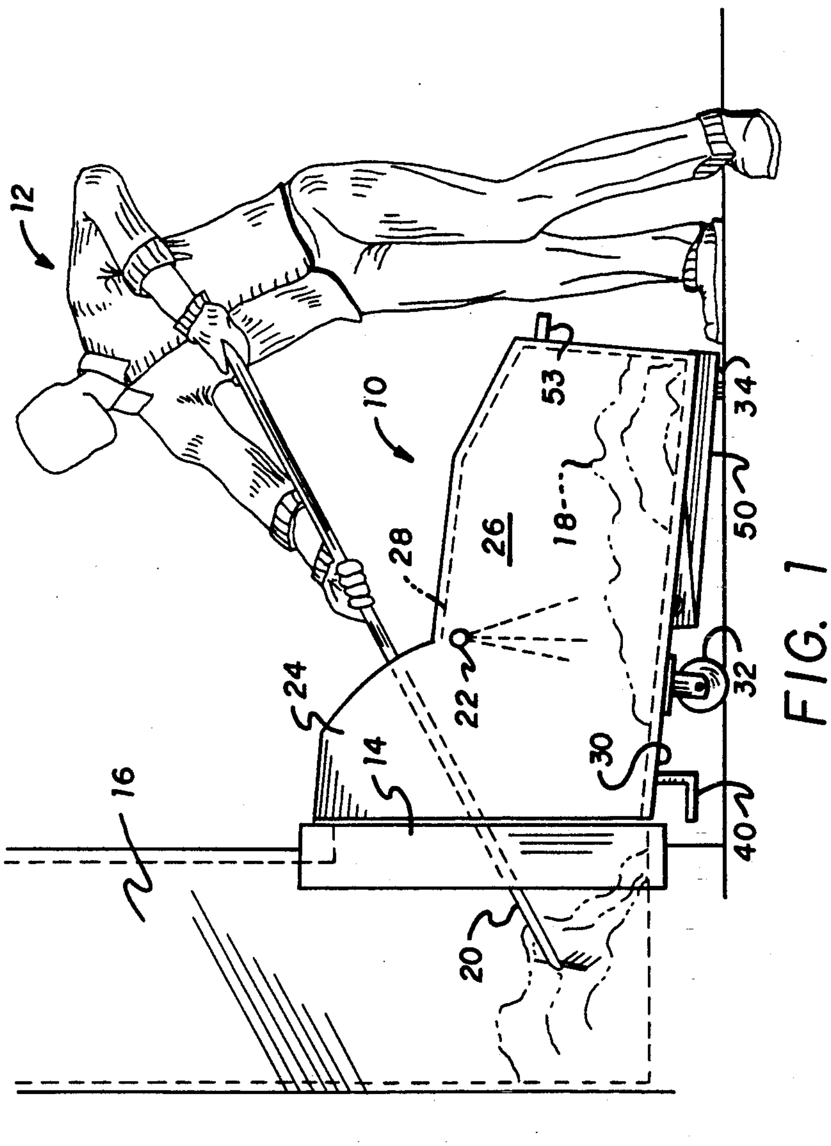
FIG. 1 is a side elevational view of the dumping container in use for its intended purpose.

Referring to FIG. 1, a workman 12 is seen filling the dumping container 10 in the intended manner. The dumping container 10 is in immediate proximity to the clean out opening 14 of the incinerator 16. Hot ashes 18 are being pulled into the dumping container by means of a heavy duty hoe 20. A water spray bar 22 acts to cool the ash 18 and largely eliminates dust. The shrouds 24 on the side walls 26 effectively block smoke and fumes from escaping the incinerator 16 by creating a relatively restricted top opening in the dumping container 10. The natural draft generated by the incinerator 16 pulls room air through this opening 14, also effectively pulling any smoke and fumes from the ashes 18 back into the incinerator 16.

Figure 2:
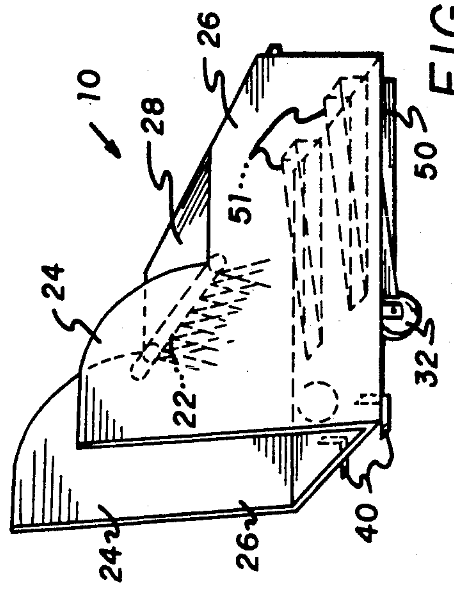
FIG. 2 is a perspective view of the dumping container at rest on a surface.
Figure 3:
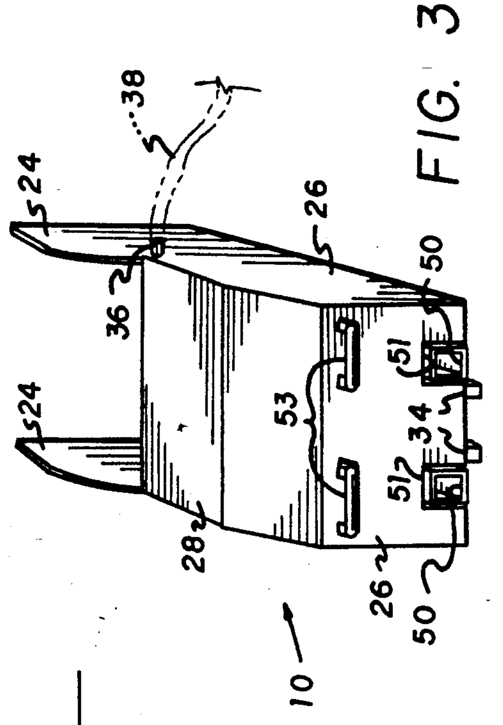
FIG. 3 is a perspective view of the dumping container as seen generally from the rear.

Referring to FIGS. 2 and 3, the dumping container 10 is shown with three vertical walls 26, partially closed top 28, and bottom 30. It is supported with a pair of rubber tired wheels 32 and fixed supports 34. A transversely mounted water spray bar 22 includes a perforated pipe with a hose adapter connection 36. A water supply and hose 38 are necessary for a temporary water connection to the dumping container 10 during clean out operations. Two hooks 40 are mounted on bottom of the container, for the purpose of engaging a tripping rail 42 (FIG. 6) mounted on one side of the top perimeter of the receiving bin 44.

Special provision, adapting the dumping container 10 to the tines 46 of a manual cable hoist 48 (FIGS. 5 and 6) are provided. In many applications, the dumping container will be light enough, even when carrying the ash load, that a motorized forklift will not be required.

Two metal box like members 50, mounted pivotally below the bottom of the container 10, are dimensioned to receive the tines 46 of the cable hoist 48. The bottom 30 of the dumping container 10 is slightly sloped, so that when accepting the ash load 18, water from the spray bar 22 will move in a direction away from the open front of the container 10. When the container 10 is hoisted, the slope becomes greater to assure that the water saturated ash load 18 remains in the dumping container 10 during transport to the final depository. This is clearly seen in FIG. 5.

Figure 6:
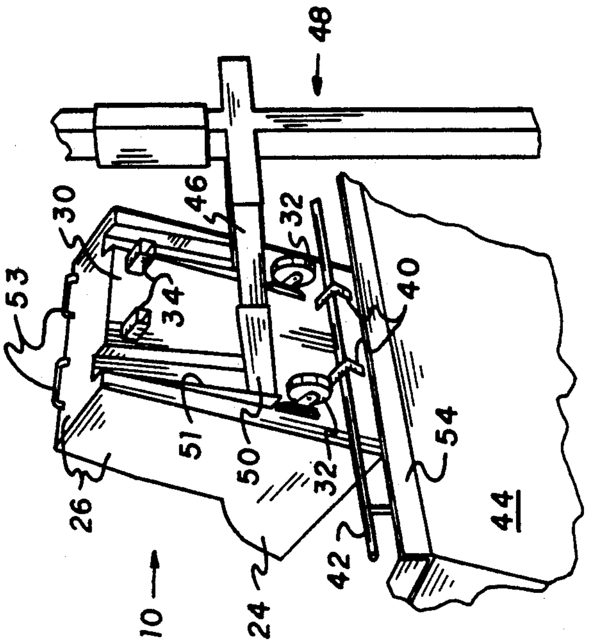
FIG. 6 is a perspective view of the dumping container being tripped and emptied.
Figure 4:
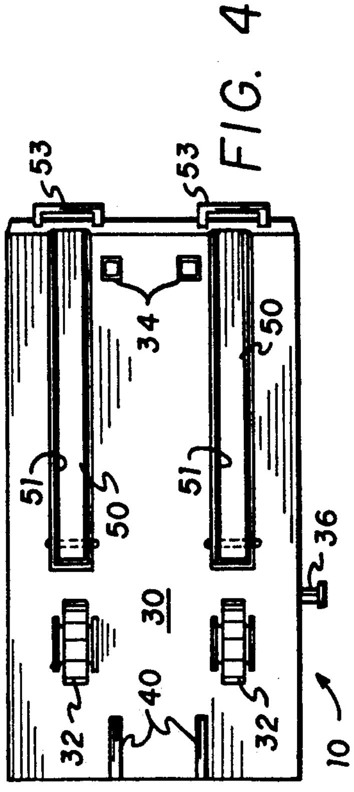
FIG. 4 is a bottom view of the dumping container.
Figure 5:
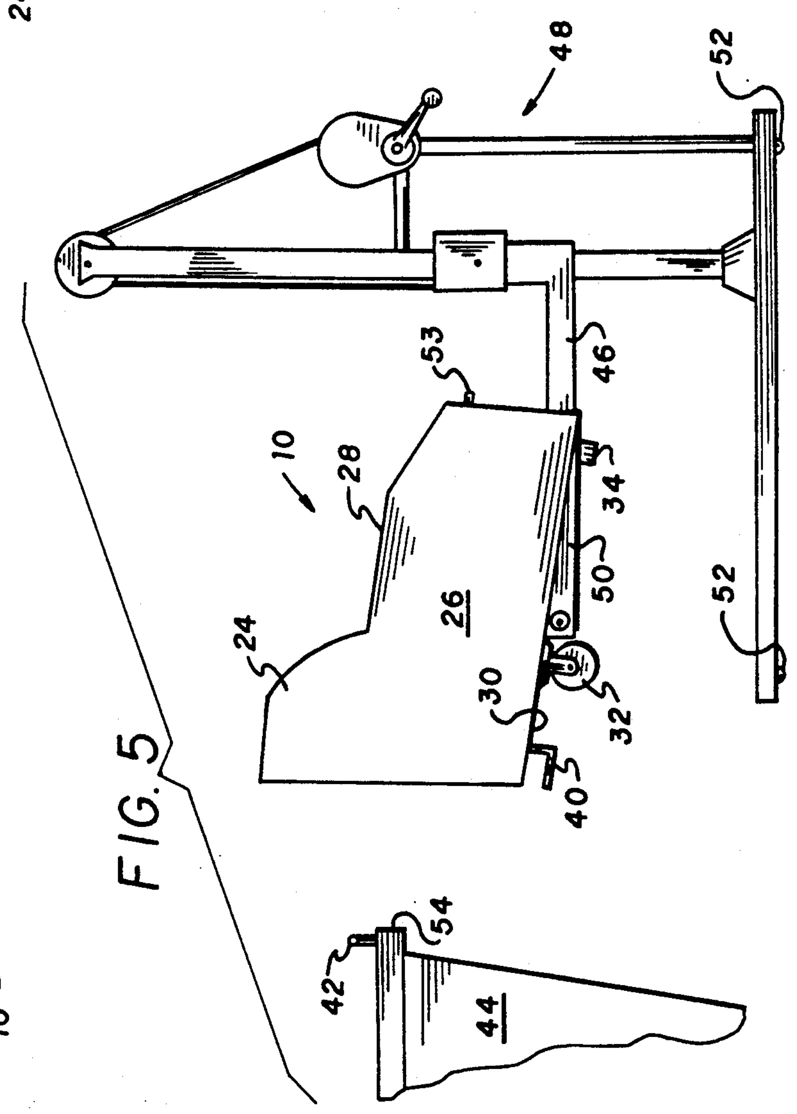
FIG. 5 is a side elevational view showing the manual hoisting operation.

Referring specifically to FIGS. 1, 2 and 5, it is seen that each pivoted box member 50 can be recessed into its inverted and sloped U channel 51, and will remain recessed when the dumping container 10 is hoisted (FIG. 5) for transport. The manual cable hoist 48 is equipped with four caster wheels 52, which permit the operator to readily transport the dumping container 10 to the repository. In the preferred embodiment, a repository is seen to be a large, dumpster type, open top receiving bin 44. To facilitate tilting the dumping container 10 for emptying, a metal tripping rail 42 is suitably supported a short distance above one side of the receiving bin 44 as shown in FIG. 6. It is a matter for the workman 12 to simultaneously raise the hoist 48 and push it forward so that the hooks 40 engage the rail 42, in order to tilt and empty the dumping container 10 of its contents. As an expedient alternative, hooks 40 may be directed to engage the topmost lip 54 of receiving bin 44.

A pair of handles 53 are affixed to the rear wall of container 10, as best seen in FIG. 3, to facilitate manual moving, positioning, receiving and dumping operations.

It is to be understood that the present invention is not limited to the embodiments described above, but encompasses any and all embodiments within the scope of the following claims.

I claim:

1. A self-emptying dumping apparatus to effect removal, transport and dumping of loose, particulate material such as ashes located at a bottom of a conventional incinerator, said apparatus comprising:

a container of generally rectangular configuration including a generally flat bottom having a forward edge, a pair of vertical side walls having forward edges, a back wall, a partially open, top covering member, and an open, material receiving front end defined by said bottom and side wall forward edges, said open, top covering member enabling entry of an ash removing tool from above said container though a clean out opening whereby said particulate material may be removed through said clean out opening into said container by said ash removing tool;

means for supporting said container with said bottom being normally rearwardly sloped when said container is resting upon a horizontal surface, to retain said removed particulate material within said container by gravity; and at least two pivoted frame members, extending fore and aft of said container bottom, being of hollow, boxlike construction, and dimensioned to receive tines of an otherwise conventional, manually operated cable hoist means, said manually operated cable hoist means being operable for lifting, transporting and emptying said container into an open receiving vessel, each said frame member being pivotally mounted on said container bottom, adjacent said bottom forward edge, to enable said container to be emptied into said open receiving vessel without disengaging said tines from said frame members.

2. The invention as claimed in claim 1, including means defining a pair of fore and aft extending recesses in the bottom of said container, for housing said pivotally mounted frame members.

3. The invention as claimed in claim 1, further comprising an internally, transversely mounted water spray bar, disposed between and connected to said side walls for connection to a source of water under pressure.

4. The invention as claimed in claim 1, further comprising L-shaped hook member means fastened to said bottom of said container, adjacent said bottom forward edge, which engageably cooperate with trip member means located on an open edge of said open receiving vessel, thus to effect tilting and dumping of said container and emptying of material therein into said open receiving vessel.

5. The invention as claimed in claim 1 wherein said container is dimensioned and arranged to facilitate removal of ash and other particulate material from said clean out opening of said conventional incinerator, said container vertical side walls further comprising sidewall shroud baffle means for maintaining an inflow of ambient air to said conventional incinerator while preventing escape of smoke and fumes from said conventional incinerator clean out opening into the environment.

6. The invention as claimed in claim 5, wherein said partially open, top covering member further comprises a forward edge, terminating midway between said container back wall and said vertical side wall forward edges, thus defining an open vent adjacent said sidewall shroud baffle means, for further assisting in maintaining an inflow of ambient air into said conventional incinerator clean out opening during the removal of ash and particulate material from said conventional incinerator, through the incinerator clean out opening and into said container, said open vent further providing said entry for said ash removing tool therethrough and into the incinerator clean out opening.

7. The invention as claimed in claim 1, wherein said means for supporting said container comprise a pair of vertical support members, depending from said container bottom adjacent said container back wall, and a pair of wheels rotatably mounted adjacent said container bottom forward edge.

8. The invention as claimed in claim 1, wherein said manually operated cable hoist means includes manual means for operating a cable to achieve lifting of said tines and therefore said container, and caster roller means to enable said manually operated cable hoist means with said container to be manually transported to said open receiving vessel.

* * * * *